United States Patent
Uchiyama et al.

(10) Patent No.: US 6,860,507 B2
(45) Date of Patent: *Mar. 1, 2005

(54) PROTECTIVE CUSHION FOR VEHICLE OCCUPANT'S HEAD

(75) Inventors: Atsuyuki Uchiyama, Shiga (JP); Yasushi Masuda, Shiga (JP); Ryosuke Nakanishi, Shiga (JP)

(73) Assignee: Takata Corporation, Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/382,898

(22) Filed: Mar. 7, 2003

(65) Prior Publication Data

US 2003/0160434 A1 Aug. 28, 2003

Related U.S. Application Data

(60) Division of application No. 09/517,448, filed on Mar. 2, 2000, now Pat. No. 6,554,314, which is a continuation-in-part of application No. 09/377,714, filed on Aug. 20, 1999, now Pat. No. 6,199,898.

(30) Foreign Application Priority Data

Mar. 2, 1999 (JP) ............................................ 11-054293

(51) Int. Cl.$^7$ ............................................. B60R 21/22
(52) U.S. Cl. .................................... 280/730.2; 280/749
(58) Field of Search ............................. 280/729, 730.2, 280/743.1, 749

(56) References Cited

U.S. PATENT DOCUMENTS

| | | | |
|---|---|---|---|
| 5,316,336 A | * | 5/1994 | Taguchi et al. .......... 280/730.2 |
| 5,788,270 A | | 8/1998 | Hang et al. |
| 5,865,465 A | | 2/1999 | Bauer et al. |
| 5,899,486 A | | 5/1999 | Ibe |
| 6,056,316 A | | 5/2000 | Yamaji et al. |
| 6,199,898 B1 | * | 3/2001 | Masuda et al. .......... 280/730.2 |
| 6,299,199 B1 | | 10/2001 | Bowers et al. |
| 6,378,895 B1 | * | 4/2002 | Brucker et al. .......... 280/730.2 |
| 6,390,502 B1 | | 5/2002 | Ryan et al. |
| 6,402,190 B1 | | 6/2002 | Heudorfer et al. |
| 6,409,211 B1 | * | 6/2002 | Sheng et al. ............. 280/730.2 |
| 6,412,810 B1 | | 7/2002 | Wipasuramonton et al. |
| 6,554,314 B1 | * | 4/2003 | Uchiyama et al. ....... 280/730.2 |
| 6,637,769 B2 | * | 10/2003 | Peer et al. ............... 280/730.2 |

FOREIGN PATENT DOCUMENTS

| EP | 0 924 122 A1 | 11/1998 |
|---|---|---|
| WO | WO 96/26087 A1 | 8/1996 |

* cited by examiner

Primary Examiner—Ruth Ilan
Assistant Examiner—Toan C To
(74) Attorney, Agent, or Firm—Foley & Lardner LLP

(57) ABSTRACT

To provide a protective cushion for a vehicle occupant's head which can introduce gas into chambers simultaneously or with desired time lags among the chambers. A cushion 1 comprises an occupant-side sheet 2 and a body-side sheet 3 which are superposed on each other and sewn together so as to form vacant chambers 11 through 14 between the sheets 2 and 3. A cylindrical member 20 is disposed between upper portions of the sheets 2, 3. Gas supplied through a rear end 21 of the cylindrical member 20 is introduced into the chambers 11 through 14 through openings 22, 23 and a front end 24 of the cylindrical member 20.

9 Claims, 8 Drawing Sheets

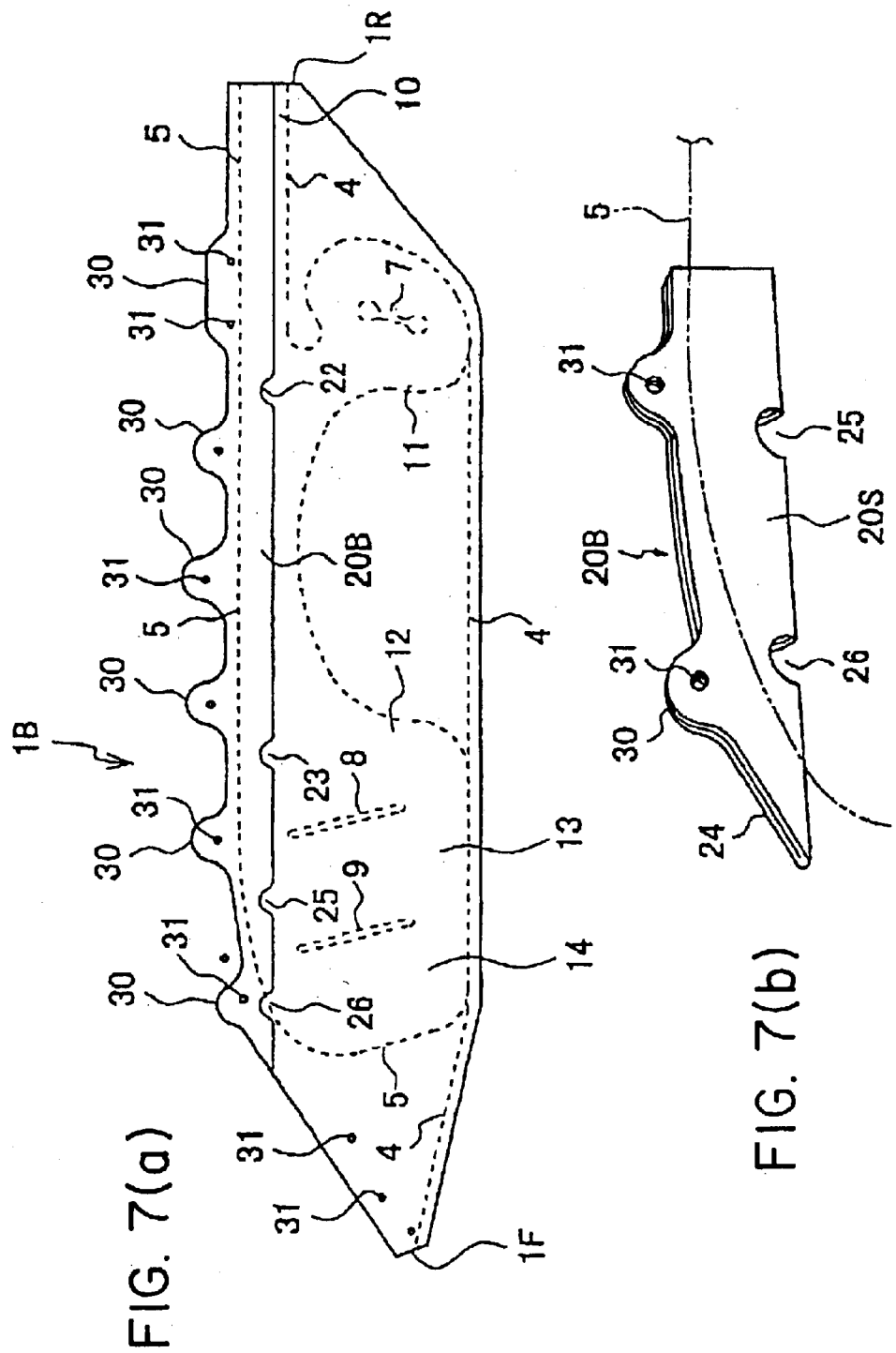

US 6,860,507 B2

PROTECTIVE CUSHION FOR VEHICLE OCCUPANT'S HEAD

The application is a continuation-in-part of U.S. patent application Ser. No. 09/377,714 filed on Aug. 20, 1999, now U.S. Pat. No. 6,199,898 and a divisional application of U.S. patent application Ser. No. 09/517,448 filed on Mar. 2, 2000, now U.S. Pat. No. 6,554,314.

BACKGROUND OF THE INVENTION

1. Field of the Invention

The present invention relates to a protective cushion for a vehicle occupant's head and, more particularly, to a cushion which can be inflated along windows of side doors in the event of a side impact or roll-over situation. In detail, it relates to a protective cushion for a vehicle occupant's head comprising two sheets which are superposed on each other and joined together to form a plurality of chambers arranged in the longitudinal direction of a vehicle.

2. Description of the Related Art

Such a type of a protective cushion for a vehicle occupant's head is disclosed in International Patent Publication W096/26087. particularly, FIG. 1 and FIG. 9 of the publication. The known cushion has a vacancy comprising a duct extending from the end at the front side of a vehicle (the front end) to the end at the rear side of the vehicle (the rear end) along the upper edge of the cushion and a plurality of cells (chambers) communicating with the duct and extending downwardly. Between the adjacent cells, a occupant-side sheet (hereinafter, sometimes referred to as "cabin-side sheet") and a vehicle body-side sheet (hereinafter, sometimes referred to as "door-side sheet") are connected.

SUMMARY OF THE INVENTION

According to the cushion disclosed in W096/26087. the duct is formed by interweaving the cabin-side sheet and the door-side sheet.

The duct thus formed is not proper for introducing gas into the cells as the goal.

It is an object of the present invention to provide a protective cushion for a vehicle occupant's head which can introduce gas into chambers formed between sheets timely.

A protective cushion for a vehicle occupant's head according to the present invention is disposed in the vicinity of a corner between a ceiling and a aide surface of a vehicle cabin so that it is adapted to be inflated with introduced gas downwardly along the side surface. The protective cushion comprises an occupant-side sheet and an body-side sheet which are superposed on each other and joined together so as to form a plurality of vacant chambers between the sheets into which gas is filled wherein the chambers are arranged in the longitudinal direction of the vehicle, and wherein the cushion has a gas passage at an upper portion thereof extending in the longitudinal direction of the vehicle. The protective cushion is characterized in that the gas passage is composed of a cylindrical member provided separately from the sheets wherein the gas passage is provided with at least one opening on the midway thereof.

In the protective cushion for a vehicle occupant's head, gas supplied to the cylindrical member is supplied into chambers through an end of the cylindrical member and/or openings formed in the cylindrical member. By selecting the length of the cylindrical member and/or the positions of the openings, gas can be introduced into desired chambers from desired positions.

The cylindrical member may be made of a sheet or may be a pipe made of metal or synthetic resin. In case of the cylindrical member being made of a sheet, the sheet composing the cylindrical member (hereinafter, sometimes referred to as "cylindrical member sheet"), the cabin-side sheet, and the door-side sheet are sewn together by a yarn. According to the cushion, the sewing is both for forming the cylindrical member and for sewing together the cabin-side sheet and the door-side sheet, thus reducing the man-hour for manufacturing the cushion.

According to the present invention, the upper portion of the cushion, where the cylindrical member sheet, the cabin-side sheet, the door side sheet are superposed on each other, may be provided with small holes through which bolts or rivets for fixing the cushion to the vehicle body. In this case, the force applied to the cylindrical member is transmitted directly to the vehicle body.

In case of the cylindrical member being made of a sheet, the cylindrical member is connected neither to the cabin-side sheet nor to the door-side sheet.

According to the present invention, the protective cushion further comprises a means or control device disposed in the cylindrical member at a portion downstream from the opening in the gas flowing direction, wherein the means or control device closes or reduces the sectional area of the passage of the cylindrical member until the gas pressure supplied in the cylindrical member reaches a predetermined value, and enlarges the sectional area of the passage of the cylindrical member when the gas pressure in the cylindrical member exceeds the predetermined value. The means or control device may be composed of yarn which can be broken.

BRIEF DESCRIPTION OF THE DRAWINGS

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

FIG. 7(a) is a front view of a cushion according to a third embodiment of the invention, and FIG. 7(b) is a partial enlarged view of FIG. 7(a).

DETAILED DESCRIPTION OF THE PREFERRED EMBODIMENTS

Figure 1:
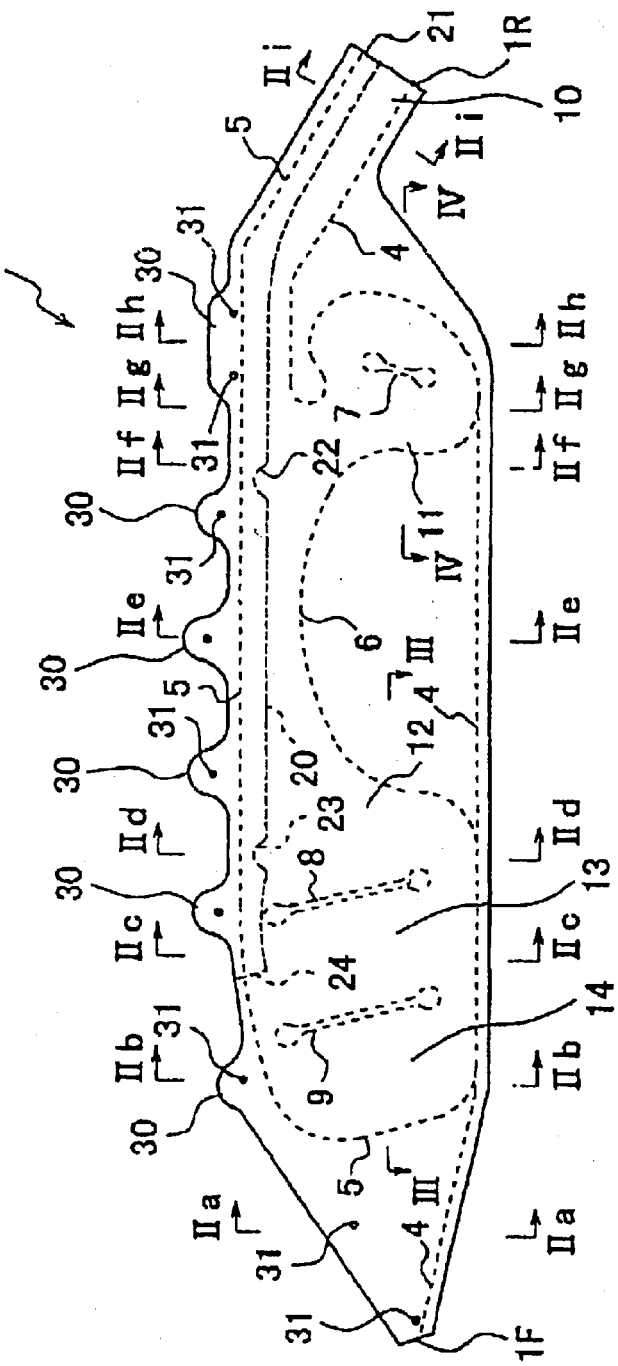
FIG. 1 is a front view of a protective cushion for a vehicle occupant's head according to a first embodiment of the invention.
Figure 2:
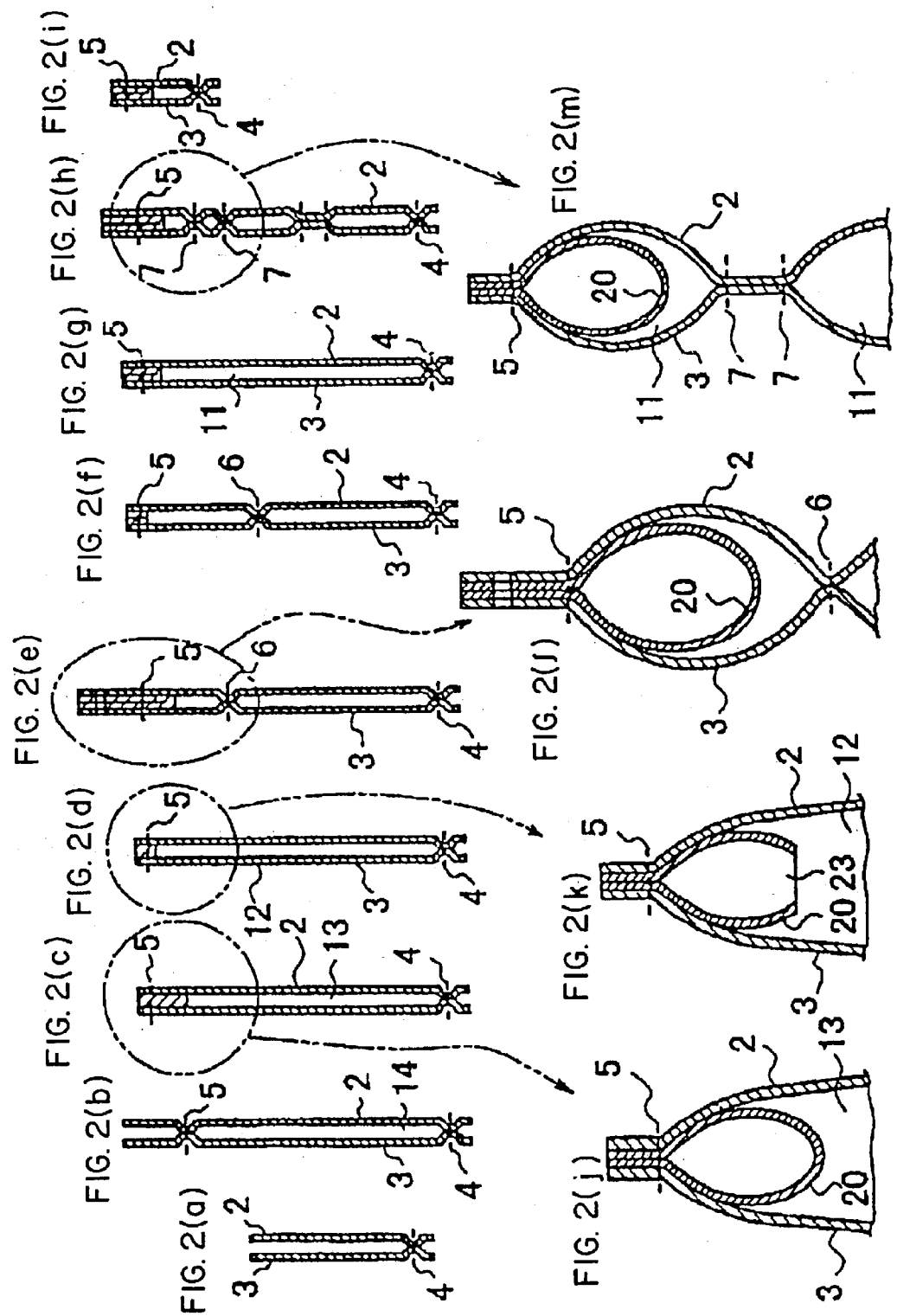
FIGS. 2(a) through 2(i) are sectional views taken along lines IIa—IIa through IIi—IIi of FIG. 1, respectively.
FIGS. 2(j) through 2(m) are sectional views of upper portions of the sections shown in FIGS. 2(c), 2(d), 2(e), and 2(h) showing the cushion in the inflated state.
Figure 3:
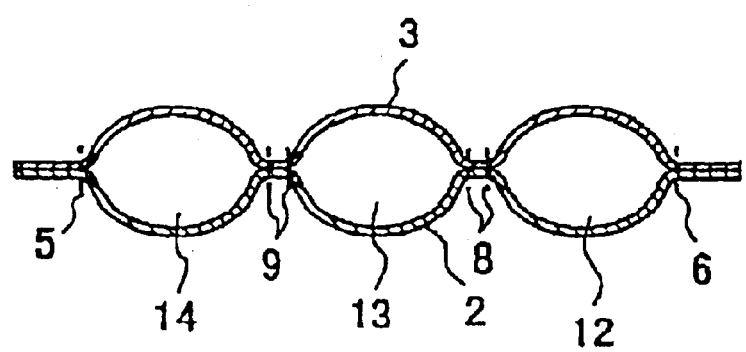
FIG. 3 is a sectional view showing the inflated cushion taken along line III—III of FIG. 1.
Figure 4:
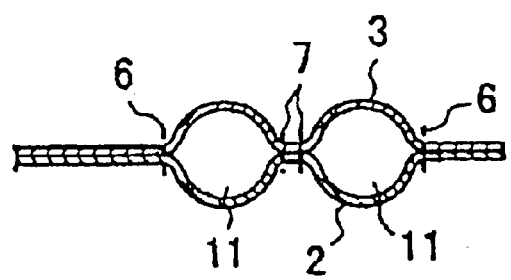
FIG. 4 is a sectional view showing the inflated cushion taken along line IV—IV of FIG. 1.
Figure 5:
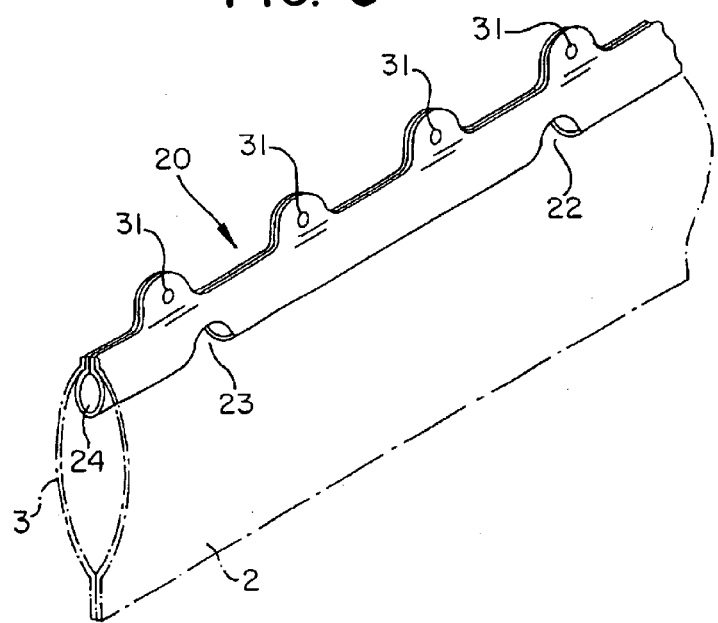
FIG. 5 is a perspective view of a cylindrical member.

Hereinafter, preferred embodiments of the present invention will be described with reference to the attached drawings.

The cushion 1 is a protective cushion for a vehicle occupant's head; it comprises an occupant-side sheet (cabin-side sheet) 2 and an body-side sheet (door-side sheet) 3 which are superposed on each other and sewn together (numerals 4 through 9 designate stitches) so as to form vacant chambers (hereinafter, sometimes referred to as only "chambers") 11 through 14 between the sheets 2 and 3.

The stitch 4 extends along the lower edges of the sheets 2, 3 from the front end 1F to the rear end 1R of the cushion 1. The stitch 4 is curved into a U-like shape away from the lower edges of the sheets 2, 3 in the vicinity of the rear end IR, thus forming an elongated chamber 10 between the stitches 5 and 4.

The stitch 5 extends along the upper edges of the sheets 2, 3 and extends downwardly from the vicinity of the front end 1F apart from the upper edge so as to meet with the stitch 4.

The stitch 6 sews middle portions of the sheets 2, 3 together in the vicinity of the middle of the longitudinal direction of the cushion 1. The main part of the stitch 6 extends in the longitudinal direction in the middle of the vertical direction of the cushion 1 and the both end portions of the stitch 6 extend in the vertical direction to meet with the stitch 4. The stitch 6 separates the chambers 11, 12 from each other. The chambers 11, 12 communicate with each other at their upper portions.

The stitch 7 sews the sheets 2, 3 together at approximately the center of the chamber 11, in order to prevent the thickness of the chamber 11 (the maximum distance between the sheets 2, 3) from exceeding a predetermined range.

The stitches 8, 9 extend in the vertical direction to separate chambers 12, 13, 14 from each other. The chambers 12, 13, 14 communicate with each other at their upper portions and their lower portions.

A cylindrical member 20 is disposed between upper portions of the sheets 2, 3. The cylindrical member 20 comprises a long band-like sheet 20S which is folded longitudinally into two and is arranged between the upper portions of the sheets 2, 3 such that the folded portion is positioned at lower side. The sheet 20S is sewn together with the sheets 2, 3 by the stitch 5 so as to form the cylindrical member 20.

The cylindrical member 20 has a rear end at the same position as the rear end 1R of the cushion 1 and an open front end 24 at a position above the chamber 13. Formed on the midway of the cylindrical member 20 are an opening 22 facing the chamber 11 and an opening 23 facing the chamber 12. Connected to the rear end 21 is an inflator (not shown).

In this embodiment, the openings formed in the cylindrical member are designed so that the nearer relative to the inflator, the smaller, achieving the equal gas supply to the respective chambers 11 through 14.

The sheets 2, 3 and the sheet of the cylindrical member 20 are each provided with a plurality of projections 30 upwardly projecting from the cushion 1. These projections 30 have small holes 31 formed therein. The cushion 1 is fixed to the vehicle body by inserting bolts or rivets through these email holes 31. The impact at the inflation of the cylindrical member 20 is transmitted to the vehicle body through the bolts or rivets, not via the sheets 2, 3. The required strength of the sheets 2, 3 can be reduced.

For example, the cushion 1 is arranged such that the rear end 1R is disposed on a C pillar of the vehicle and the front end 1F is disposed on an A pillar of the vehicle. The cushion 1 is folded and arranged along a roof side rail. As described above, connected to the rear end 21 of the cylindrical member 20 is the inflator.

The folded cushion 1 is covered by a cover. The cover is structured to be torn or opened into the cabin when the cushion 1 is inflated. The cover may be exclusive for the protective cushion or may be an interior garnish of the vehicle.

As the vehicle comes in lateral collision or roll-over, the inflator is actuated so that gas flows into the cylindrical member 20 through the rear end 21. The gas flows inside the cylindrical member 20 and partially enters into the chambers 11, 12 through the openings 22, 23 so as to inflate the chambers 11, 12. The gas partially enters into the chambers 13, 14 through the front end 24 of the cylindrical member 20 so as to inflate the chambers 13, 14. The inflated chamber 11 expands on the side of the head of an occupant sitting on a rear seat and the inflated chambers 12, 13, 14 expand on the side of the head of an occupant sitting on a front seat.

In the cushion 1, the cylindrical member 20 is provided so that gas flows out through the openings 22, 23, and the front end 24 of the cylindrical member 20 into the chambers 11 through 14 according to a predetermined rout. Thus, the chambers 11 through 14 are inflated substantially at the same time.

Figure 6:
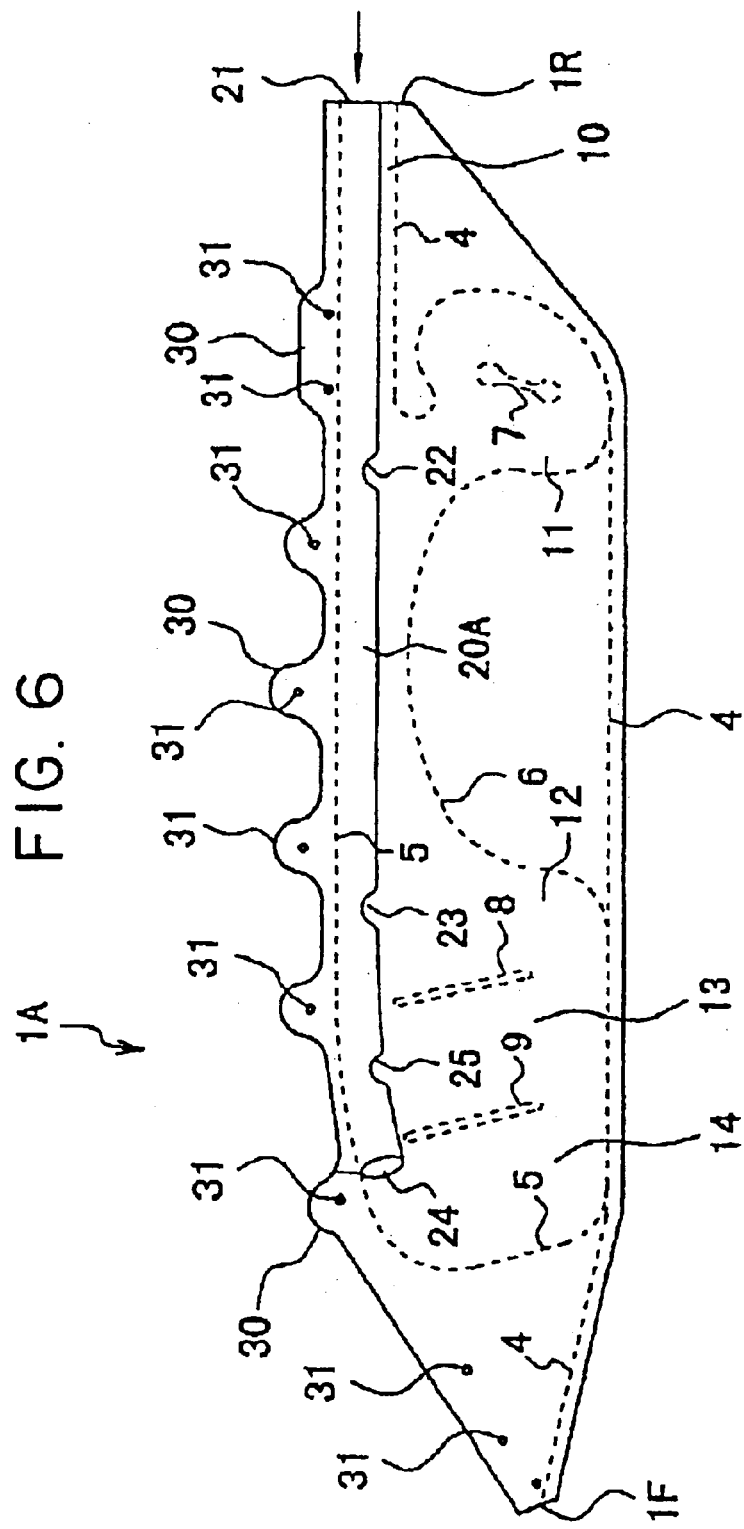
FIG. 6 is a front view of a cushion according to a second embodiment of the invention.

FIGS. 6, 7(*a*), 7(*b*) are front views of protective cushions 1A, 1B according to second and third embodiments, respectively. In FIGS. 6, 7(*a*), 7(*b*), cylindrical members 20A, 20B are shown in the through-vision state. Each rear portion of the cushions 1A, 1B has a horizontal upper side and an oblique lower side.

In FIG. 6, a front end 24A of the cylindrical member 20A is positioned in the chamber 14. The cylindrical member 20A is provided with an opening 25 facing the chamber 13.

In FIG. 7, a front end 24B of the cylindrical member 20B is positioned at edges of the sheets 2, 3. The cylindrical member 20B is provided with openings 25, 26 facing the chambers 13, 14, respectively.

Other structures of the cushions shown in FIGS. 6, 7(*a*), 7(*b*) are the same as those of the cushion shown in FIGS. 1 through 5 so that the other components of FIGS. 6, 7(*a*), 7(*b*) are designated by the same numerals of FIG. 1. In the cushion 1A, gas from the inflator flows out through the openings 22, 23, 25 and the front end 24A of the cylindrical member so as to inflate the chambers 11 through 14. In the cushion 1B, gas from the inflator flows out through the openings 22, 23, 25, 26 so as to inflate the chambers 11 through 14. In both of the cushions 1A, 1B, gas is supplied to the chambers 11 through 14 according to a predetermined route. Also in both of the cushions 1A, 1B, the chambers 11 through 14 are inflated at substantially the same time.

Figure 8A:
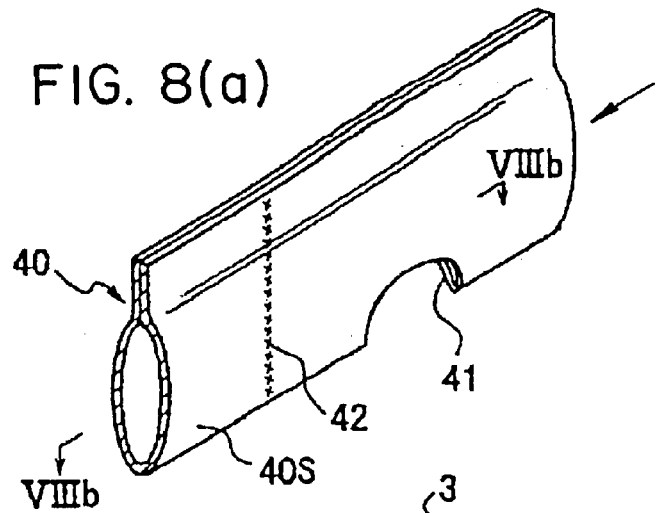
FIG. 8(a) is a perspective view of a cylindrical member.
Figure 8B:
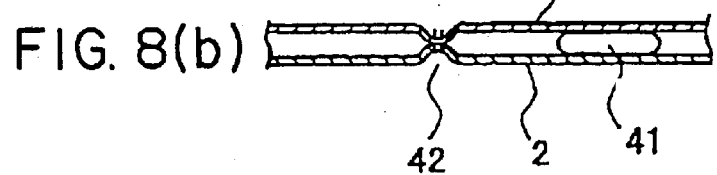
FIG. 8(b) is a sectional view taken along line VIIIb—VIIIb of FIG. 8(a).

FIGS. 8(*a*), 8(*b*), 9 show cylindrical members 40, 40A allowing the inflation of the chambers 11 through 14 with some time lags. Each cylindrical member 40, 40A comprises a sheet 40S which is folded longitudinally into two. An upper portion of the folded sheet 40S is sewn together with the sheets 2, 3 by the stitch 5 so as to form the cylindrical member 40, 40A. Each cylindrical member 40, 40A has an opening 41, through which gas flows out, on the midway of the longitudinal direction of the cylindrical member. Each cylindrical member 40, 40A is provided with stitches 42, which can be broken, at a portion downstream from the opening 41. In FIG. 8(*a*), the stitches 42 extend from the upper edge to the lower edge of the cylindrical member 40, entirely closing the passage inside the cylindrical member 40. On the other hand, in the cylindrical member 40A, the stitches 42 close only an upper half of the passage inside the cylindrical member 40A.

As gas is introduced into the cylindrical member 40, 40A, the gas flows out through the opening 41. As the gas pressure at the upstream side than the stitches 42 exceeds a predetermined value and loaded to yarn of the stitches 42 is tension larger than the tensile strength of the yarn, the yarn of the stitches 42 are broken so that large amount of gas flows downstream than the stitches 42.

Figure 9:
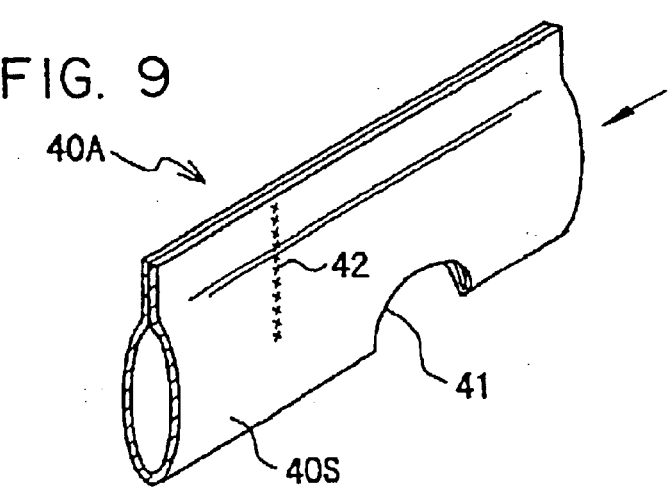
FIG. 9 is a perspective view of a cylindrical member.

As mentioned above, the stitches 42 can achieve the staggered inflation among the chambers. It can be structured that a larger amount of gas is introduced into a larger chamber while a smaller amount of gas is introduced into a smaller chamber. The stitches 42 closing a part of the passage inside the cylindrical member as shown in FIG. 9 may not be broken. In this case, the stitches 42 function as a constriction in the passage of the cylindrical member until the termination of inflation of the cushion.

Figure 10:
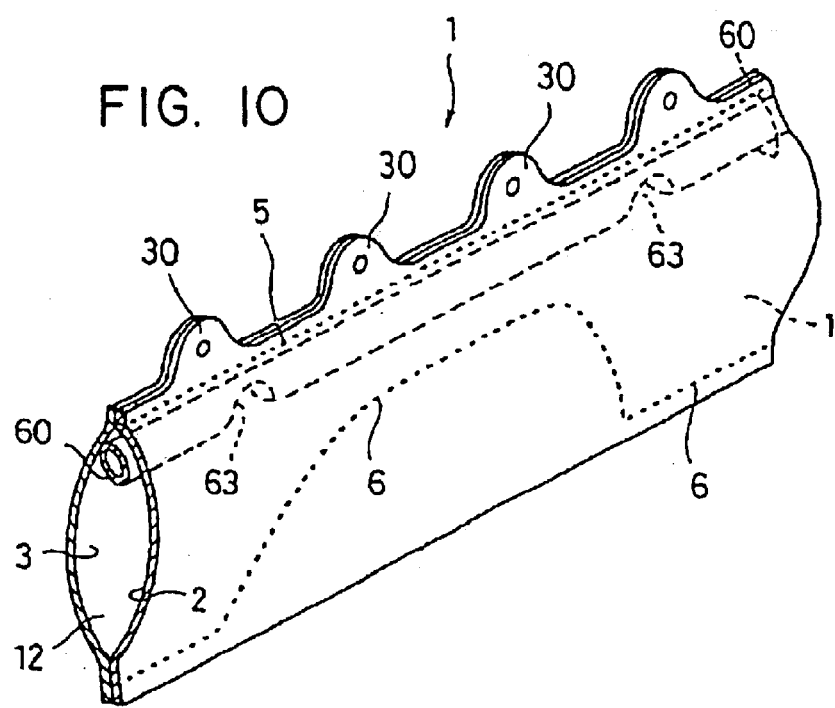
FIG. 10 is a perspective sectional view of a cushion with a cylindrical member.
Figure 11:
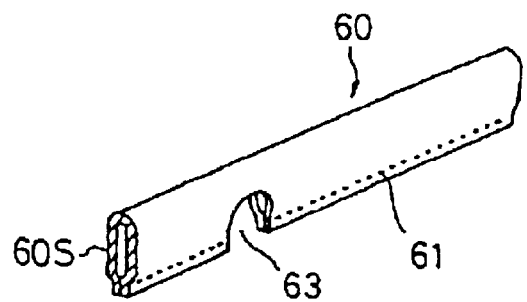
FIG. 11 is a perspective view of the cylindrical member.

Though the sheet 20S comprising the cylindrical member 20 is partially sewn to the cabin-side sheet 2 and the door-side sheet 3 at the projections 30 in the above embodiments, a sheet 60S comprising a cylindrical member 60 may be sewn neither to the sheet 2 nor to the sheet 3 as shown in FIGS. 10 and 11. The cylindrical member 60 is made of the long band-like sheet 60S by superposing and sewing together longitudinal sides of the sheet 60S. Numeral 61 designates stitches. The cylindrical member 60 is provided with a plurality of openings 63 through which gas is supplied into respective chambers 11, 12, 13, 14 (the chambers 13, 14 are not shown in FIG. 10) in the cushion 1. The cylindrical member 60 may include the stitches 42 described above.

When the sheet is fabric, sewing is preferably employed as the connecting means for the sheets. When the sheet is synthetic resin, adhesive bonding or welding is preferably employed as the connecting means for the sheet.

Though the cylindrical member is made of a sheet in the above embodiments, the cylindrical member may be a pipe made of metal or a synthetic resin.

Though the cushion has the length from the A pillar to the C pillar in the above embodiments, the cushion may extend from the A pillar to the B pillar, or, from the B pillar to the C pillar. The gas inlet of the cylindrical member may be positioned at the front end thereof or at a middle portion of the cylindrical member.

As described above, according to the present invention, gas can be supplied to chambers of a protective cushion for a vehicle occupant's head at the same time or with desired time lags among the chambers.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The description of the invention in the priority document here, Japanese patent application number H11-054293 filed Mar. 2, 1999, including the specification, claims, and drawings, is hereby incorporated by reference. Also incorporated by reference is co-pending U.S. patent application Ser. No. 09/377,714 filed Aug. 20, 1999.

What is claimed is:

1. A cushion for protecting a vehicle occupant, the cushion being disposed along the side surface of a vehicle cabin and comprising:
   an occupant-side sheet and a body-side sheet superposed on the occupant side sheet, the sheets being joined together to form a plurality of inflatable chambers between the sheets;
   wherein the chambers are positioned along the longitudinal direction of the vehicle;
   a gas passage formed by a cylindrical member extending in the longitudinal direction of the vehicle along the entire length of the sheets;
   wherein the cylindrical member is separate from and provided between the occupant and body-side sheets;
   wherein the cylindrical member includes first and second ends and has at least one opening between first and second ends for providing fluid communication between the gas passage and at least one of the inflatable chambers.

2. The cushion of claim 1, wherein the cylindrical member is formed from a folded sheet.

3. The cushion of claim 2, wherein the cylindrical member, the occupant-side sheet, and the body-side sheet are sewn together by a common yarn.

4. The cushion of claim 1, wherein the cylindrical member extends to the forward most edge of the occupant and body-side sheets so that the first end of the cylindrical member is coextensive with the edge of the occupant and body-side sheets.

5. The cushion of claim 1, wherein the first end of the cylindrical member is closed so that gas cannot escape the cylindrical member through the first end.

6. The cushion of claim 5, wherein the cylindrical member includes an additional opening between the first and second ends.

7. The cushion of claim 6, a control device disposed in the cylindrical member at a portion between the at least one opening and the additional opening, wherein the control device closes or reduces the cross-sectional area of the passage of the cylindrical member until gas pressure supplied in the cylindrical member reaches a predetermined value, and enlarges the cross-sectional area of the passage of the cylindrical member when the gas pressure in the cylindrical member exceeds the predetermined value.

8. The cushion of claim 7, wherein the control device comprises yarn which can be broken.

9. The cushion of claim 1, further comprising a control device disposed in the cylindrical member at a portion upstream from the opening in a gas flowing direction, for reducing a cross-sectional area of the passage of the cylindrical member.

\* \* \* \* \*